United States Patent
Vale

(10) Patent No.: US 9,028,686 B2
(45) Date of Patent: May 12, 2015

(54) INTERNAL MAGNETIC FILTER FOR HYDRAULIC SYSTEMS

(75) Inventor: Joel Vale, McAllen, TX (US)

(73) Assignee: BBB Industries, LLC, Mobile, AL (US)

( * ) Notice: Subject to any disclaimer, the term of this patent is extended or adjusted under 35 U.S.C. 154(b) by 289 days.

(21) Appl. No.: 13/558,452

(22) Filed: Jul. 26, 2012

(65) Prior Publication Data

US 2014/0027364 A1 Jan. 30, 2014

(51) Int. Cl.
*B01D 35/06* (2006.01)
*B01D 29/27* (2006.01)
*B03C 1/30* (2006.01)
*B03C 1/28* (2006.01)
*B03C 1/033* (2006.01)

(52) U.S. Cl.
CPC ............ *B01D 35/06* (2013.01); *B01D 29/27* (2013.01); *B03C 1/288* (2013.01); *B03C 2201/18* (2013.01); *B03C 1/0332* (2013.01); *B03C 2201/30* (2013.01); *B03C 1/30* (2013.01)

(58) Field of Classification Search
CPC ........ B03C 1/0332; B03C 1/28; B03C 1/286; B03C 1/288; B03C 1/30; B03C 2201/18; B03C 2201/30; B01D 35/06; B01D 29/27
USPC ............... 210/222, 226, 695, 167.03, 167.04, 210/167.02, 167.08, 167.29, 167.31, 172.4, 210/172.5, 172.6, 172.2, 174, 295, 314, 210/315, 316, 317, 318, 416.4, 416.5, 210/416.1, 448, 460, 473, 474, 478, 477
See application file for complete search history.

(56) References Cited

U.S. PATENT DOCUMENTS

| | | | | |
|---|---|---|---|---|
| 3,203,551 | A * | 8/1965 | Loan, Jr. | 210/486 |
| 4,026,805 | A * | 5/1977 | Fowler | 210/223 |
| 4,743,369 | A * | 5/1988 | Geermans et al. | 210/167.29 |
| 5,217,610 | A * | 6/1993 | McClain et al. | 210/223 |
| 5,609,760 | A * | 3/1997 | Leach | 210/416.1 |
| 5,643,451 | A * | 7/1997 | Harris et al. | 210/448 |
| 5,672,273 | A * | 9/1997 | Ball | 210/448 |
| 5,755,962 | A * | 5/1998 | Gershenson et al. | 210/452 |
| 7,704,384 | B2 | 4/2010 | Stein | |
| 2011/0253607 | A1 | 10/2011 | Becker et al. | |
| 2013/0175212 | A1 * | 7/2013 | Baba | 210/416.1 |

OTHER PUBLICATIONS

Acurazine, "DIY—Add a Power Steering Replaceable Inline Magnetic Filter—AcuraZine Community," http://rdx.acurazine.com/forums/showthread.php?t=828859, printed on Apr. 30, 2012, 26 pages.

* cited by examiner

*Primary Examiner* — David C Mellon
(74) *Attorney, Agent, or Firm* — Lewis Rice LLC

(57) ABSTRACT

A simple inlet filter element for use primarily in power steering columns which is comprised of a mesh filter, a magnet attached to the mesh filter and a button cap. The filter is installed in a port or conduit through which steering fluid flows and is held in place by the button cap element.

9 Claims, 2 Drawing Sheets

INTERNAL MAGNETIC FILTER FOR HYDRAULIC SYSTEMS

BACKGROUND OF THE INVENTION

1. Field of the Invention

This disclosure is related to the field of hydraulic system filtration, in particular, to filter devices and apparatuses that are utilized to remove debris from automotive power steering fluid circulating through a power steering system.

2. Description of Related Art

Automotive power steering systems generally include a pump that circulates power steering fluid through the steering gear of a vehicle, a cooler, and back through the pump. In the process, debris, including small metal and ferrous particles from the metal surfaces of the power steering system, can be released into the power steering system. Thus, both metallic and non-metallic particles are often released into the system during use. Under the high pressure of the power steering system, the debris and metal particles form an abrasive-slurry. This abrasive-slurry can wear and/or damage the phenolic seals in the pump and steering rack. Further, this abrasive-slurry can travel via the power steering fluid throughout the entire steering system, causing wear and clogging various orifices and hoses, which can lead to expensive repairs. Accordingly, the debris and metallic particles and the damage they cause can be a major cause of power steering system failure.

Simply placing an internal filter in the power fluid steering system is insufficient to solve the problems caused by the presence of debris and ferrous particles in a power steering system. While these filter mechanisms can trap most of the non-metallic debris, they are generally unable to trap the minute ferrous metal particles which do most of the damage to the system since these particles are often small enough to pass through the filter. Further, installed internal filters can become clogged with debris which results in a failure of the flow of fluid within the system and catastrophically affects the operation of the vehicle's power steering.

One method currently utilized in the art to filter out debris and ferrous particles from a power steering system is a magnetic filter. A filtering element in these devices generally removes the larger non-metallic particles in the fluid. The magnetic ferrous components which are too small to be captured by the filtering element are generally removed by a magnet which is located at the return port of the pump.

An example of magnetic collection in conjunction with a filter device is provided in the "Self Dislodging Filter Element" of Stein, U.S. Pat. No. 7,704,384. While the filter of Stein is an advancement over traditional internal filters in that it is able to capture the smaller ferrous particles suspended in the power steering fluid, it still has inherent problems. First, the filter of Stein and similar filters of the prior art are generally self-dislodging which leads them to be easily removed from required location during installation and transportation, thus negating the ability to filter the fluid. Another problem with prior art magnetic internal filters like the filters disclosed in Stein arises from the placement of the magnetic element at the inlet port, with the mesh attached thereto. Problems with this orientation include contamination collecting on the magnet at the inlet port which restricts the overall flow of fluid within the power steering system, thus increasing the restriction as the metal contaminant is collected. In addition, the flow of the hydraulic fluid can dislodge contaminants attached to the magnet at the inlet port that are not contained by the mesh filter. Another problem is that the metallic contamination collects sludge and this sludge-like paste can attach to the magnet. This results in a higher detachment force required for the dislodging of the magnet for bypass. Further, in the event the mesh filter detaches from the magnet at the inlet port, both the floating mesh and the containments are a detriment to the pump in the power steering system. Even more problems associated with prior art magnetic internal filters like the filters disclosed in Stein include the following: a higher micron rating of the magnet which allows more contaminates to get into the pump; the orientation of the mesh bonded to the magnet inlet port creates a weak attachment which can result in separation of the mesh from the magnet inlet port and subsequent damage to the system when the pump uptakes the free floating mesh; and the fact that the filter has to dislodge to bypass.

Accordingly, there is a need in the art for a simple filter system and device that can filter out both debris and ferrous particles from a steering fluid system that is not at risk for inadvertent dislocation and separation of the mesh filter element.

SUMMARY OF THE INVENTION

Because of these and other problems in the art, described herein, among other things, is a simple inlet filter element for use primarily in power steering columns which is comprised of a mesh filter, a magnet attached to the mesh filter and a button cap. The filter is installed into the reservoir at the return port or conduit through which steering fluid flows and is held in place by the button cap element permanently.

In one embodiment, the internal magnetic filter assembly described herein comprises a mesh filter having an open end portion and a closed terminating end portion; a button cap having a cylindrical base and a chamfered cylinder; and a magnet; wherein the open end portion of the mesh filter is attached to the cylindrical base of the button cap; and wherein the magnet is located within and attached to the mesh filter between the open and closed ends.

In one embodiment, the internal magnetic filter further comprises one or more bypass holes located in the cylindrical base of the button cap.

In addition, in another embodiment the chamfered cylinder is inserted into an opening into a return port of a reservoir of a power steering fluid system. It is contemplated that in one embodiment this opening comprises an intake to the return port of the reservoir.

In another embodiment of the internal magnetic filter, the mesh filter may comprise woven mesh or may be shaped as a rectangular bag. If the filter is shaped like a rectangular bag, there is a possibility that the bag will have a fish tail closure.

In one embodiment of the internal magnetic filter, the filter will be ultra-sonically welded to the button cap. In one embodiment, the button cap will be comprised of molded plastic.

DESCRIPTION OF THE PREFERRED EMBODIMENT(S)

Figure 1:
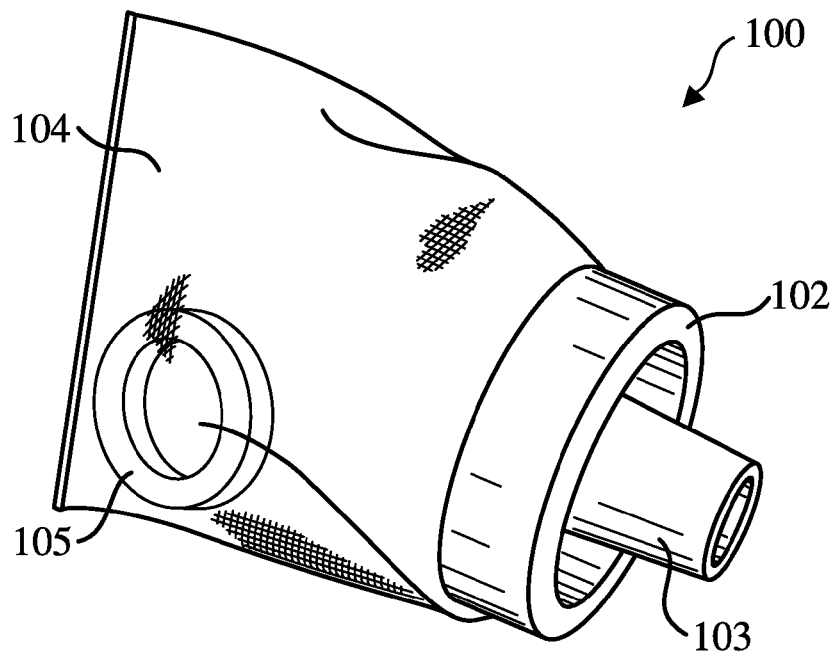
FIG. 1 provides a side perspective view of an embodiment of the power steering internal magnetic filter.

FIG. 1 provides a side prospective view an embodiment of the power steering internal magnetic filter (100). Among other uses and applications, it is contemplated that the internal magnetic filter (100) disclosed herein will be utilized in an automotive power steering column. Thus, it is contemplated that, in certain embodiments, the disclosed internal magnetic filter (100) will be used in a power steering system with a power steering pump that is driven by the drive belt of an engine to circulate power steering fluid. In certain embodiments of the closed loop system, the fluid is first delivered through a high pressured hose to the power steering gear of the steering system where it hydraulically assists the steering functions of the vehicle. From the steering gear, the fluid circulates through the return line back to the power steering pump reservoir. As described previously in this application, solid particles (both metallic and non-metallic) resulting from the wear of power steering systems are usually present in the power steering fluid and cause contamination, increased friction, and higher fluid temperatures to the system as a whole. These suspended particles in the system can also cause deterioration of the hoses and seals in the system.

Figure 4:
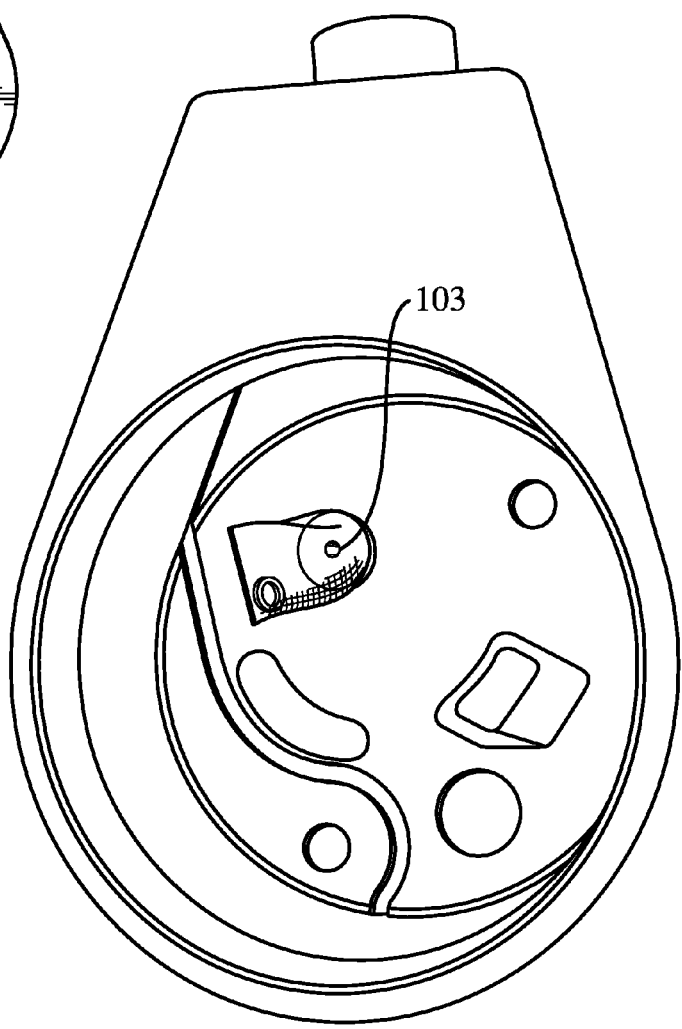
FIG. 4 provides a perspective view of an embodiment of the power steering internal magnetic filter installed in a return port of a reservoir of a power steering system.

In one embodiment, the internal magnetic filter (100) will generally be semi-permanently installed in a return port of a reservoir in the power steering system. Stated differently, the chamfered cylinder (103) of the button (102) of the internal magnetic filter (100) is inserted into (is internal to) the return port of the reservoir in a manner such that it forms a generally semi-permanent attachment at the intake port of the reservoir. As used herein, "semi-permanent" attachment of the internal magnetic filter (100) shall mean a form of attachment by which, unlike the present art, the pressure of the system will generally not dislodge the filter from its point of attachment. Instead, external tools would generally be needed to remove the filter (100). As described further herein, when installed in the return port of the reservoir of the power steering system, the internal magnetic filter (100) removes entrained debris within the power steering fluid and also traps smaller ferrous particles that might otherwise pass through the filter element. FIG. 4 provides a perspective view of an embodiment of the internal magnetic filter (100) installed in a reservoir at the inlet port. Notably, installation of the internal magnetic filter (100) in the reservoir of the power steering system is not determinative. It is contemplated that the internal magnetic filter (100) may be installed at any position in the power steering system or other hydraulic system where it could remove entrained debris and smaller ferrous particles within the power steering fluid.

FIG. 1 depicts a side perspective view of an embodiment of the internal magnetic filter (100) of this application. As depicted therein, the internal magnetic filter (100) generally comprises three main component parts: a button (102), a filter (104) and a magnet (105).

Figure 2:
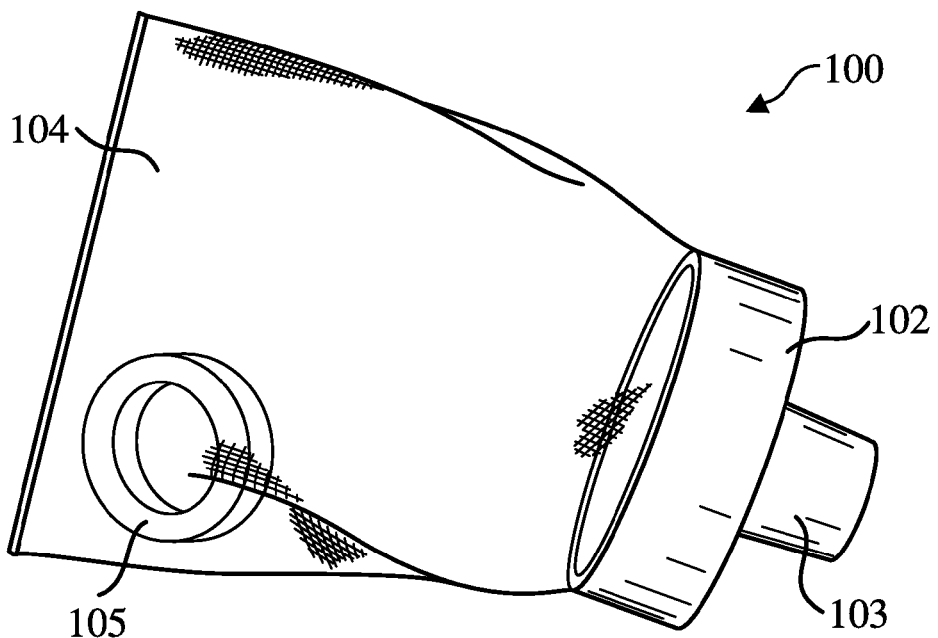
FIG. 2 provides another side perspective view of an embodiment of the power steering internal magnetic filter.
Figure 3:
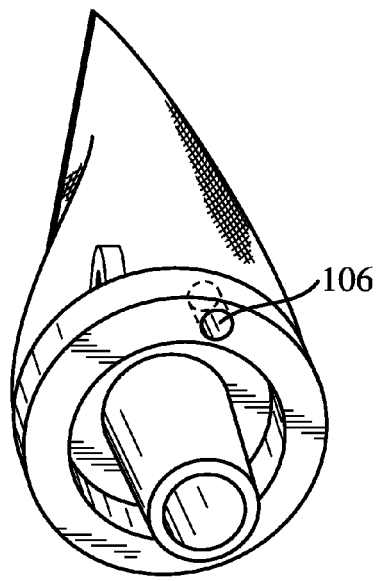
FIG. 3 provides a front perspective view of an embodiment of the power steering internal magnetic filter.

The filter (104) of the internal magnetic filter (100) is generally comprised of a woven mesh known to those of ordinary skill in the art. As depicted in FIGS. 1-3, in one embodiment, the filter (104) generally takes the shape of a rectangular bag. In this embodiment, the filter (104) is open at the end at which it connects to the button (102) and closed at the terminal end. In the depicted embodiment, at the terminating end the filter is closed in a fish tail vertical orientation. Notably, however, any shape or form of the filter (104) which is closed at the terminating end, creates an open interior from which liquid has to travel through to exit and can connect to the button (102) at its open end is contemplated as an orientation for the filter (104) in the present application. The open end of the filter (104) is generally permanently attached to the button (102). In one embodiment, the button (102) and the open end of the mesh filter (104) will be ultra-sonically welded to each other. However, the form of attachment of the mesh filter (104) to the button (102) is not determinative and it should be noted that any form of attachment through which the mesh filter (104) can be attached to a button (102) in a manner that renders the mesh filter (104) generally permanently attached to the button (102) is contemplated. Further, in certain embodiments it is contemplated that the mesh filter (104) will generally have a larger mesh surface area than the filters of the prior art, thereby increasing the surface area in which contamination can collect.

In one embodiment depicted in FIGS. 1-3, the button (102) of the internal magnetic filter (100) is generally a molded cap with a cylindrical base component and a chamfered cylinder component (103) which is smaller in circumference than the broader cylindrical base component. The chamfered cylinder component (103) may also include one or more friction ring or other component on its external surface which is designed to increase surface tension. This orientation and form generally gives the button (102) of this embodiment the general orientation of a dropper. In this embodiment of the button (102), the open end of the mesh filter (104) attaches to the cylindrical base component through embedding, sonic welding, or some other methodology known to those of ordinary skill in the art. The chamfered cylinder component (103) of the button (102) of this embodiment is the portion of the button (102) installed into the return port of the reservoir (or other component in different embodiments) of the power steering system.

This installation of the chamfered cylinder component (103) of the button into the return port of the reservoir is generally accomplished via a mechanical form of attachment known to those of ordinary skill in the art such as a press fit, an interference fit or a friction fit. The specific orientation and dimensions of the chamfered cylinder (103) are not determinative; any orientation and dimensions which allow for the button (102) to be securely installed into the return port of the reservoir or other component part of a power steering system are contemplated. However, the presence of bypass holes (106), as discussed later, may influence the preferred installation direction. As depicted in FIGS. 1-3, the terminating end of the chamfered cylinder (103) of the button (102) is open, creating a path for the power steering fluid to travel through the chamfered cylinder (103), through the cylindrical base of the button (102) and into the mesh filter (104). In one embodiment, such as the embodiment depicted in FIGS. 1-3, the button (102) will be comprised of molded plastic. However it should be noted that any moldable material, either synthetic or plastic, that is known to those of ordinary skill in the art is contemplated for the button (102) of the internal magnetic filter (100).

In one embodiment, as depicted in FIG. 3, the button (102) contains one or more bypass holes (106). The bypass holes (106) are holes in the cylindrical base component of the button (102), as depicted in FIG. 3. These one or more bypass holes (106) operate to keep the internal filter working even after the mesh filter (104) becomes completely clogged. In the embodiment of the internal filter (100) with bypass holes (106), the bypass holes (106) will be located on the top of the button (102) relative to the opening in the button (102) where the "top" is defined as the side highest from a point of local gravity when the power steering system is installed in a vehicle.

Because of the low pressure in the reservoir created by the traditional power steering fluid system, the bypass holes (106) will only be utilized when the chamfered cylinder (103) of the button (102) becomes clogged and the pressure differential is overcome, moving the fluid toward the bypass holes (106) located at the top of the button (102). Thus, contrary to the filters of the prior art, the internal filter (100) does not dislodge when the internal filter element (100) becomes clogged. Instead, if a clog occurs which begins to affect fluid flow adversely, the fluid pressure generated by the fluid impinging on the clogged filter creates a force sufficient to overcome the pressure differential and the fluid will begin to travel through the one or more bypass holes (106).

Another component of the internal magnetic filter (100) described herein is an attached magnet (105). Generally any material or object, either natural or synthetic, that is capable of producing a magnetic field is contemplated as a possible magnet (105) for use in the internal filter (100). Further, the strength of the magnet (105) is not determinative. Any strength magnet that is capable of attracting the ferrous (or other metallic) particles that can become suspended in a power steering fluid system is contemplated in this application. Furthermore, the shape and dimensions of the attached magnet (105) are not determinative. The attached magnet (105) may take any shape and size known to those of ordinary skill in the art that allows it to fit inside the mesh filter element (104).

In one embodiment depicted in FIGS. 1-3, the magnet (105) will generally take the shape of a torus or ring. In this embodiment in which the magnet (105) is circular, the weight of the magnet (105) is reduced and the surface area of the magnet (105) to which ferrous particles can attach is augmented. Generally, any orientation of the magnet (105) within the mesh filter (104) element is contemplated. For example, the magnet (105) may be attached in any manner in any position inside the mesh filter (104) element. For example, as depicted in FIGS. 1-3, in one embodiment the magnet (105) will be attached to the bottom of the mesh filter (104). Generally, in this attached magnet (105) embodiment any form of attachment known to those of ordinary skill in the art is contemplated. Accordingly, attachment of the magnet (105) to the mesh filter (104) via adhesive, sewing, clipping, or any other form of mechanical attachment known to those of ordinary skill in the art is contemplated. In FIGS. 1-3, the magnet (105) is attached to the bottom of the mesh filter (104) via an adhesive. However, in an alternative embodiment, it may be sewn in, such as by providing a thread through the mesh filter's (104) mesh and the center hole of the magnet (105).

Generally, the magnet (105) serves two important functions in the internal magnetic filter (100). First the magnet (105) functions to trap any small ferrous particles traveling in the power steering fluid that cannot be captured by the mesh filter (104). Second, in the unlikely event the mesh filter (104) component would ever rip or become detached from the button (102), the magnet (105) attached to the mesh filter (104) would usually cause the mesh filter (104) to become attached to another metal metallic component of the power steering system, thereby preventing it from being sucked up into the pump of the power steering system and causing damage to the system as a whole.

For example, in certain embodiments it is contemplated that the magnet (105) attached to the mesh filter (104) of the internal magnetic filter (100) will be attached to a metallic wall near the reservoir while the internal magnetic filter (100) is attached to the reservoir. This orientation acts as a failsafe. In the unlikely event the mesh filter (104) would ever become detached from the internal magnetic filter (100), the mesh filter (104) would never be released into the power steering system fluid as it would already be attached to a metallic surface of the system. In a still further embodiment, the magnetic connection to a wall of the reservoir can be simulated by adhering the magnet (105) and/or a portion of the mesh filer (105) to a wall of the reservoir.

Notably, while the internal magnetic filter (100) disclosed herein has been described in conjunction with installation into a power steering system, it should be understood that the internal magnetic filter (100) can be used in other applications such as automatic transmissions of automobiles and other motor driven equipment in which it is desirable to remove the fine contaminants and particles that accumulate in the fluid.

In sum, the internal magnetic filter (100) has numerous advantages over the filter elements presently utilized in power steering systems. First, unlike some of the present filter systems, the internal magnetic filter (100) disclosed herein cannot generally be dislodged from its installed location during installation and transportation. With the button (102) element, the internal filter (100) is generally semi-permanently attached to the return port of the reservoir (or other element) of the power steering system. Second, in the disclosed internal magnet filter system (100) there is no magnet at the inlet port which can become contaminated and, later, restrict flow through the filter even if the mesh of the filter is still relatively clean. Rather, in the disclosed internal magnetic filter (100) the magnet element (105) of the filter is located away from the inlet port.

Third, in comparison to the filters of the prior art, the mesh filter (104) of the disclosed internal filter has a lower macro rating. Fourth, in the filters of the prior art the mesh filter is generally bonded to the magnet, which creates a weaker attachment allowing separation from the filter and the magnet. In certain embodiments of the internal magnetic filter (100) this is not a problem as the mesh is ultra-sonically welded to the button (102). Fifth, in the internal filters of the prior art the mesh filter could easily become separated from the magnet attachment and travel through the power steering system and into the pump, causing damage. In the internal magnetic filter (100), the magnet (105) is attached to the mesh filter (104). Accordingly, if the mesh filter (104) were ever to separate from the button (102), the magnet (105) would cause the cause the mesh filter (104) to attach to another metal element of the power steering system, preventing it from traveling into and becoming lodged in the power steering system, thereby causing damage to the system.

Sixth, in the systems and devices of the prior art when the filter became clogged, the filter would become dislodged from the inlet port. In the internal magnetic filter (100), there are one or more bypass holes (106) built into the button (102) of the filter (100) which allow for a clog in the system to be bypassed without requiring the dislodging of the whole internal magnetic filter device (100). In addition, a larger mesh filter (104) area in the disclosed magnetic internal filter device (100) allows for more contamination to collect in the filter (104) prior to the necessitated use of the one or more bypass holes (106).

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. An internal magnetic filter assembly for use in a power steering pump reservoir comprising:
   a mesh filter in the shape of a bag, the mesh filter bag having an open end portion and a closed terminating end portion;
   a button cap having a cylindrical base, including a bypass hole therethrough, and a chamfered cylinder, said chamfered cylinder being configured to connect into an intake to a return port of a reservoir of a power steering fluid system with sufficient force to not be dislodged by pressure within the power steering fluid system; and
   a magnet;
   wherein the open end portion of the mesh filter bag is attached to the cylindrical base of the button cap;
   wherein the magnet is located within and attached to the mesh filter bag between the open end portion and the closed terminating end portion; and
   wherein power steering fluid will flow from said chamfered cylinder and through said mesh filter bag unless the mesh filter bag becomes clogged with debris, then the power steering fluid will flow from the filter via the bypass hole.

2. The internal magnetic filter assembly of claim 1, wherein the mesh filter bag comprises woven mesh.

3. The internal magnetic filter assembly of claim 1, wherein the mesh filter bag is shaped as a rectangular bag.

4. The internal magnetic filter assembly of claim 3, wherein the closed terminating end portion of the mesh filter bag is closed by a single line of connection forming a fish tail closure.

5. The internal magnetic filter assembly of claim 1, wherein the mesh filter bag is ultra-sonically welded to the button cap.

6. The internal magnetic filter assembly of claim 1, wherein the button cap is comprised of molded plastic.

7. The internal magnetic filter assembly of claim 1 wherein said magnet is in the shape of a ring.

8. The internal magnetic filter assembly of claim 1 wherein said magnet is mechanically attached to said mesh filter bag.

9. The internal magnetic filter assembly of claim 8 wherein said magnet is attached via a method selected from the group consisting of: adhering, sewing, clipping, and combinations thereof.

* * * * *